United States Patent [19]
Drake, Jr.; et al.

[11] Patent Number: 5,461,611
[45] Date of Patent: Oct. 24, 1995

[54] QUALITY OF SERVICE MANAGEMENT FOR SOURCE ROUTING MULTIMEDIA PACKET NETWORKS

[75] Inventors: John E. Drake, Jr., Pittsboro; Elizabeth A. Hervatic, Cary; Joseph W. Pace, Cary; Ralph J. Potok, Cary; David E. Taber, Wake Forest, all of N.C.

[73] Assignee: International Business Machines Corporation, Armonk, N.Y.

[21] Appl. No.: 255,219

[22] Filed: Jun. 7, 1994

[51] Int. Cl.$^6$ ........................................... H04Q 11/00
[52] U.S. Cl. ........................ 370/54; 370/17; 370/94.1
[58] Field of Search ............................ 370/54, 94.1, 60, 370/85.5, 85.6, 85.7.85.13, 94.3, 13, 17

[56] References Cited

U.S. PATENT DOCUMENTS

| | | | |
|---|---|---|---|
| 4,858,232 | 8/1989 | Diaz et al. | 370/60 |
| 5,347,511 | 9/1994 | Gun | 370/54 |
| 5,359,593 | 10/1994 | Derby et al. | 370/94.1 |
| 5,361,256 | 11/1994 | Doeringer et al. | 370/85.13 |
| 5,388,097 | 2/1995 | Baugher et al. | 370/85.5 |

*Primary Examiner*—Douglas W. Olms
*Assistant Examiner*—Shick Hom
*Attorney, Agent, or Firm*—Robert O. Nimtz

[57] ABSTRACT

A management system for local area networks ensures selected levels of quality of service to all transmission requests submitted to the management system. This management system is attached to the network and receives requests from all other stations on the network to reserve facilities for a particular quality of service data stream. An allocator in the management system determines if the requested facilities are available and, if so, reserves these facilities for the requesting station. If the facilities are not available, the request is denied. A hierarchical data base containing all of the current parameters of all of the network resources and all of the currently supported data streams is used to support the allocation process.

24 Claims, 10 Drawing Sheets

QUALITY OF SERVICE MANAGEMENT FOR SOURCE ROUTING MULTIMEDIA PACKET NETWORKS

TECHNICAL FIELD

This invention relates to multimedia packet transmission systems and, more particularly, to insuring adequate quality of service (QoS) for transmission of multimedia signals in local area networks.

BACKGROUND OF THE INVENTION

Multimedia applications are computer programs that provide the capability to generate, transport, and present information in textual, graphic, aural and visual formats. In many multimedia applications, information is generated or stored at devices that are remote from the using devices and human users. In such situations, a communications network must provide the transport mechanisms to users in a timely and efficient manner. Multimedia information, particularly audio and full motion video, has unique properties that impose stringent requirements on the communications network. Unexpected network delays caused by throughput or processing delays can disrupt the presentation of the multimedia data to the end user. An analogy would be trying to carry on a telephone conversation when the network introduced intermittent pauses, delays or slowdowns in the voice stream. Examples of multimedia application that put an emphasis on the network are Client/Server playback of stored multimedia data streams (e.g., library distribution), Client/Client video conferencing, and Client/Client collaborative work.

The property of multimedia information that most significantly affects requirements of the underlying network is the high bandwidth needed to transmit video data, coupled with the requirement of isochronous transmission, that is, the information must be presented to the user in real time and pace. The playback of full-screen, high-quality, stored video and audio at the standard rate of thirty video frames per second; even when compressed, requires approximately 1.2 megabits per second of bandwidth. Four megabits per second or more are required to support two-way video (interactive or conferencing) of high quality. In addition to the high bandwidth requirements, the network must assure that the data is delivered with (a priori) bounded delay. Some communications technologies, particularly time division multiplexing (TDM), are ideally suited to meeting these high bandwidth and bounded delay requirements. Unlike TDM networks, however, packet or cell based networks do not inherently guarantee the delivery of a specified quantity of data in each time interval of a specified duration. Therefore, a method is required in those packet networks to provide equivalent levels of network service for the multimedia applications. This function can be called bandwidth management, or more broadly, quality of service (QoS) management.

Emerging high bandwidth, packet and cell based technologies and architectures (e.g., B-ISDN) anticipate this requirement and thus incorporate techniques to accomplish quality of service management. These techniques typically involve the provision of a sophisticated user network interface through which the user requests a connection for multimedia transport and specifies the quality of service that is required. Within the network itself, sophisticated algorithms are provided to examine the status of resources, compute a route that best satisfies the request, reserve those resources, and notify the user that the connection has been reserved. These algorithms are expensive to implement and are among the most technically demanding functions within the network. They typically require the network to understand the capacity and delay characteristics of each communications link in the network in order to determine whether the quality of service request can be granted. In addition, they require the network to establish, maintain, and update the global network topology information data base in order to determine the optimal route for a connection Most packet based local area networks (LANs), such as token rings (IEEE Standard 802.5), do not offer these sophisticated techniques for quality of service management.

It is extremely desirable to provide apparatus and a method to control multimedia data stream entry into a LAN, based on the quality of service requirements for that particular data stream and the quality of service available in the LAN. The intent of such a technique is to deny network access to those streams whose level of quality of service requirements are not currently available in the LAN network.

SUMMARY OF THE INVENTION

In accordance with the illustrative embodiment of the present invention, multimedia data streams are managed in a local area network (LAN), or in a bridged LAN environment, by identifying all of the network components in the LANs and bridges which participate in a data path between a user of the LAN and a source of multimedia information. The quality of service parameters that describe the QoS available in each network component resource are determined dynamically or statically, stored in predetermined parameter stores, and used at the time a request for an allocation of resources is made for a multimedia transmission. When such a request is made, the stored component parameters are consulted to determine if the components in the selected path, individually and together, satisfy the requested QoS values for a multimedia transmission. If so, the request is granted. If not, the request is denied.

In accordance with one feature of the present invention, the Routing Information Field (RIF), already available in such networks for source routing of frames through bridged LANs, as taught in Section 10.3.7.3 of ISO/IEC 8802-2 PDAM 5.3, August, 1992, is used to determine the path components. As is well known, the RIF is a series of segment numbers and bridge numbers that identify the network components which a frame traverses en route from a source to a destination. Such a RIF is constructed in the prior art at the time the multi-media data stream sender and receiver establish a "session" (e.g., using a telecommunications protocol such as Net BIOS) over which the data stream is to flow. The availability of an already constructed specification of the path components significantly reduces the complexity of the QoS LAN access system of the present invention. A major advantage of the present invention is the ability to provide quality of service management in bridged LAN environments using all of the existing connection set-up procedures, thereby providing such QoS management with little added complexity. It is possible, of course, to create in the QoS management system a route selection mechanism if such a mechanism does not already exist in the LANs themselves.

In accordance with another feature of the present invention, the quality of service management of a local area network is almost entirely concentrated in a single QoS management station on the LAN, thereby significantly reducing the complexity of introducing QoS management into existing LAN networks. The QoS management station includes the topology data base required for path allocation as well as mechanisms to support for allocation requests and responses.

In accordance with yet another aspect of the present invention, QoS allocations are maintained only so long as a requestor continues to refresh the request. This fail safe garbage collection arrangement ensures rapid release of network facilities when a source or destination station of a multimedia transmission fails, or when a transmission path itself fails.

In accordance with another feature of the present invention, network topology information and current data stream allocations are maintained in a hierarchical data base with a predetermined plurality of data objects and their associated attributes. This data storage arrangements minimizes the programming effort required to create and maintain the topology data base.

In further accordance with the present invention, quality of service management of local area networks is carried out by means of messages exchanged between the multimedia source, the multimedia target (destination) and the multimedia QoS path allocator. These messages include QoS allocation requests, allocation confirmations, de-allocation requests, allocation change requests and allocation change confirmations.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
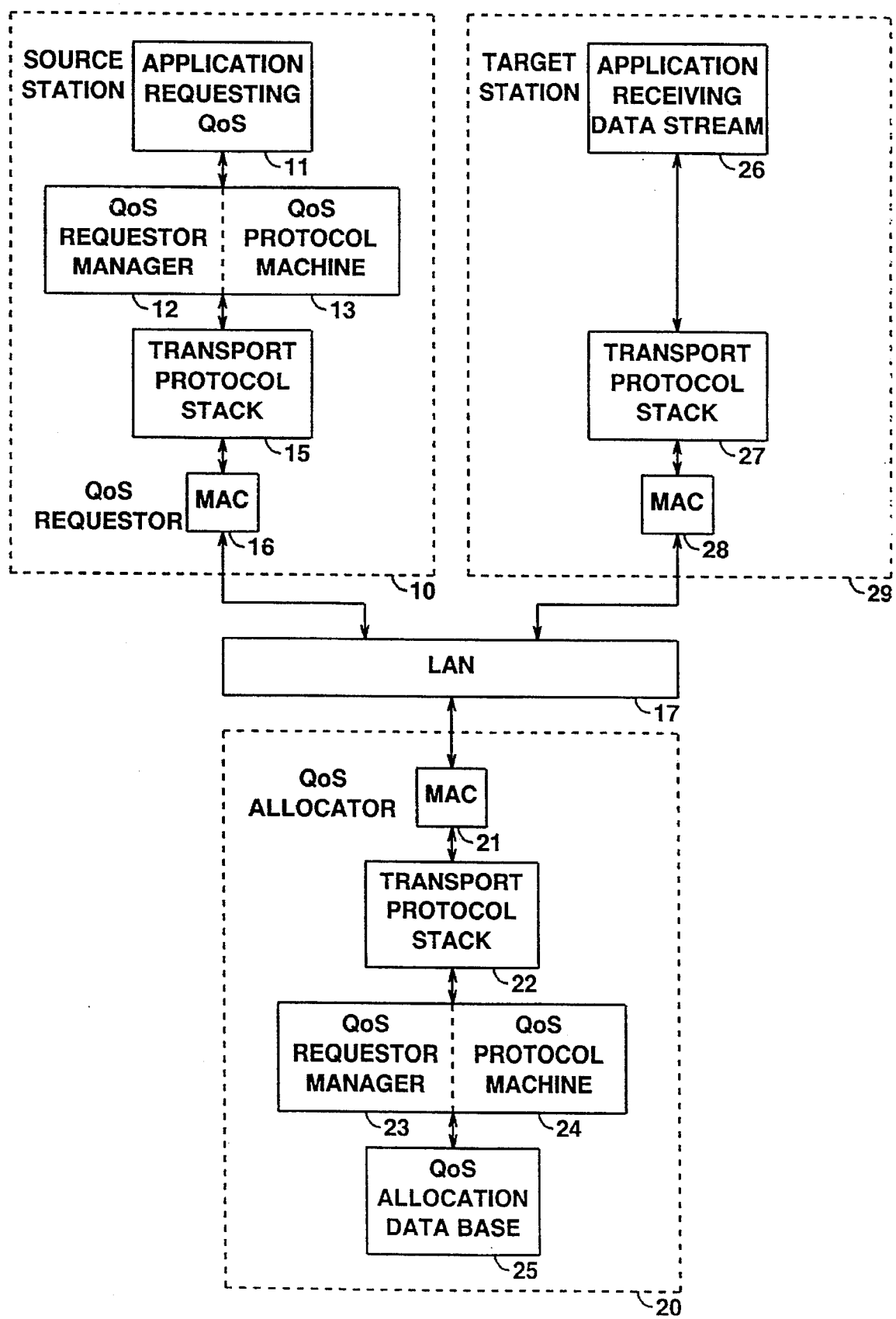
FIG. 1 shows a general block diagram of the Quality of Service (QoS) management system of the present invention for managing LAN facilities so as to provide requested quality-of-service parameters for data streams flowing through the network.

Referring more particularly to FIG. 1, there is shown a detailed block diagram of a quality of service management system for local area networks comprising a prior art local area network (LAN) 17 comprising a plurality of stations 10, 29, ..., attached thereto. LAN 17 may, for example, be a Token Ring network. In accordance with the present invention, also attached to LAN 17 is a quality of service (QoS) allocator 20 which implements a quality of service management process for LAN 17.

More particularly, station 10 is the source of a desired multimedia transmission and comprises an application 11 which requests a QoS connection to the destination or target station 29. Application 11 also is responsible for causing the transmission of the multimedia data stream, via the LAN transport protocol stack, 15 to the target station 29. Source station 10 also includes a QoS requestor manager 12 and a QoS protocol machine 13. Together, components 12 and 13 assemble a request to reserve a QoS connection for a multi-media data stream on that path through the LAN 17 between source station 10 and target station 29. Using a standard LAN transport protocol 15 to format a request packet, the packet is launched on LAN 17 through a medium access control (MAC) entity 16. LAN transport protocol 15 and MAC 16 are standard parts of all stations attached to a LAN, the details of which are determined by the LAN itself, and will not be further described here except to note that standard MAC functions are defined in IEEE standards 802.5 for token ring networks while LAN transport protocols are provided by systems such as NET BIOS (IBM Manual SC30-3383) or TCP/IP (IBM Manual GG24-3376). Target station 29 similarly includes an application 26 which is capable of receiving and utilizing the multimedia data stream transmitted from application 11 in station. 10. The overall function of allocator 20 is to receive the QoS request from station 10, examine the resources of LAN 17, and determine if a path exists in LAN 17 between station 10 and station 29 which satisfies the requested level of QoS. If the QoS exists, it is assigned to this QoS data stream. If the QoS is not available, station 10 is notified of the lack of an adequate QoS path to the intended destination.

It should be noted that application 11 may simply be a file server application which causes multimedia data to be transported from a multimedia data base to LAN 17. One such server application is the IBM OS/2 LAN Server program described in IBM Manual S04G-1046. The QoS requestor manager 12 interacts with application 11 using internal messages as is well known in the art and utilizes QoS protocol machine 13 to format the QoS request.

QoS allocator 20 is a station attached to LAN 17 which manages the QoS requests for the entire LAN 17. Like other stations, allocator station 20 includes a Medium Access Control (MAC) entity 21 and a LAN transport protocol stack 22 which provide the same functions for allocator station 20 as the similar entities provide for stations 10 and 29. Allocator station 20 also includes a QoS requestor manager 23 which, together with QoS protocol machine 24 receives, decodes and acts upon the QoS request from source station 10. In carrying out its management functions, manager 23 utilizes the data in QoS allocation data base 25 which, in general, contains all of the quality of service parameters for each of the components of LAN 17, as well as descriptions of all of the data streams already accepted by allocator 20 and the detailed constituents of the connection paths for each of those data streams. Before proceeding to a description of the operation of the quality of service management system of FIG. 1, the detailed contents of the database 25 will be discussed.

Figures 2, 3:
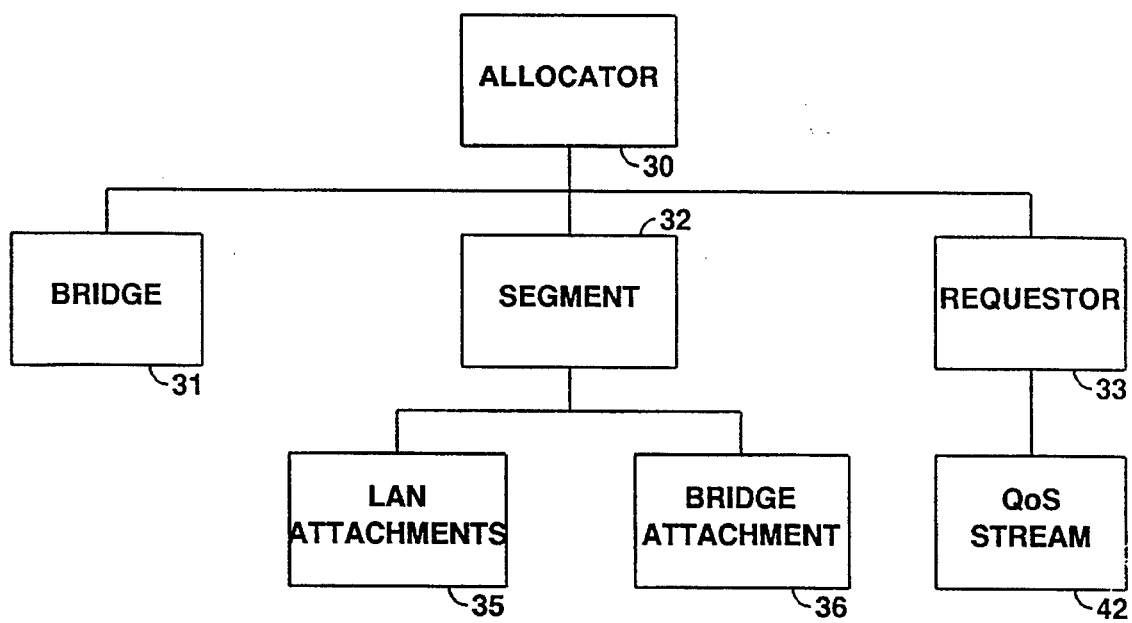
FIG. 2 shows a graphical representation of the hierarchical data base structure used to support the QoS management system of FIG. 1.
FIG. 3 shows a typical graphical representation of a QoS message in the system of FIG. 1 and, in particular, an allocation request message sent from a source station in the LAN configuration of FIG. 1 to the QoS allocator station of FIG. 1.

In FIG. 2 there is shown a graphical representation of the contents of the quality of service allocation management information database 25 of FIG. 1. As can be seen in FIG. 2, the management information database is hierarchical having seven classes of information objects to created, edited and retrieved. In order to understand the data base information represented in FIG. 2, the following definitions are in order. Quality of service management, in the present context, means the satisfaction of a number of parameters describing the quality of service required on a transmission path through a local area network (such as LAN 17) in order to initiate the transmission of multimedia digital signals on that path. While quality-of-service parameters that describe the service expected from the network can be specified in many different ways, for the purposes of this application, the following parameters are used:

Throughput—Forward Direction. The average throughput in bits per second over an interval of length T from source station 10 to target station 29.

Throughput—Backward Direction. The average throughput in bits per second over an interval of length T from the target station 29 to the source station 10.

End-to-End Delay—Forward Direction. The maximum elapsed time between the storage of a packet in the LAN entry device at source station 10 and the reception of the packet from the LAN exit device at target station 29.

End-to-End Delay—Backward Direction. The maximum elapsed time between the storage of a packet in the LAN entry device at the target station 29 and the reception of the packet from the LAN exit device at source station 10.

Delay Violation Ratio. The number of packets per hundred million which are not delivered within the End-to-End Delay, assumed to be identical in both directions.

In addition, the multimedia data that is to be transmitted can be characterized by the following set of traffic descriptors:

Maximum Packet Size—Forward Direction. The maximum length of the data unit submitted to the LAN transport protocol stack 15 (e.g., the length of a Logical Link Control Protocol Data Unit (LPDU)) that is submitted to the MAC layer of the system for transmission from the source station 10 to the target station 29.

Maximum Packet Size—Backward Direction. The maximum length of the data unit submitted to the MAC layer of the system for transmission from the target station 29 to the source station 10.

Average Packet Size—Forward Direction. The average length of the data unit submitted to the network for transmission from the source station 10 to the target station 29.

Average Packet Size - Backward Direction. The average length of the data unit submitted to the network for transmission from the target station 29 to the source station 10.

Committed Burst Size—Forward Direction. The maximum amount of data that the MAC layer of the LAN agrees to transfer over an interval of time T, from the source station 10 to the target station 29, and may or may not be interrupted, where T=Committed Burst Size/Throughput.

Committed Burst Size—Backward Direction. The maximum amount of data that the MAC layer of the LAN agrees to transfer over the interval of time T, from the target station 29 to the source station 10, and may or may not be interrupted.

Excess Burst Size—Forward Direction. The maximum amount of data in excess of Committed Burst Size that the MAC layer of the LAN will attempt to deliver over the interval of time T, from the source station 10 to the target station 29, and may or may not be interrupted.

Excess Burst Size—Backward Direction. The maximum amount of data in excess of Committed Burst Size that the MAC layer of the LAN will attempt to deliver over the interval of time T, from the target station 29 to the source station 10, and may or may not be interrupted.

Access Class—Forward Direction. The type of service to be provided by the LAN segment of source station 10, e.g., access priority, synchronous, asynchronous, etc.

Access Class—Backward Direction. The type of service to be provided by the LAN segment of target station 29.

With these quality of service parameters and traffic descriptors in mind, the discussion of the database illustrated in FIG. 2 can be seen to include a plurality of data objects including an allocator data object, requestor object, segment object, bridge object, an end-to-end QoS stream object, a component stream object, and data objects for the various attachments to the LAN. More particularly, the allocation data base 25 of FIG. 1 contains the following object classes to be managed:

Allocator 30—This class provides a summary view of the QoS Allocator's activity and has the following attributes:

1. Network Address: The network address that identifies the Allocator.
2. RefreshTimerDuration: The duration that the allocator waits for a refresh frame before incrementing the AgeSinceRefresh counter.
3. AgeLimit: The threshold of the AgeSinceRefresh counter.
4. InitializationTime: The time-of-day value the system initialized for receiving Allocation requests.
5. PresentThreshold: The time the Allocator 20 waits for a reply from a requestor station to an AllocatorPresentAnnounce message.
6. PresentRetryThreshold: The number of times the AllocatorPresentAnnounce message is re-sent to a requestor.

QoS Requester 33—This class provides a summary view of a single Requester in the network and has the following attributes:

1. Network Address: The network address that identifies this requester.
2. StreamCount: A count of the number of data streams for which QoS is currently allocated by this requestor.
3. InitializationTime: The time-of-day value when the system is initialized for receiving Allocation requests.

Segment 32—Represents QoS related information for a single segment (e.g., Token Ring), having the following attributes:
1. SegmentID: An identifier of a particular LAN segment. This identifier should have the same format as the segment identifier in the Route Designator Fields.
2. SegmentType: Identifies the type of segment (e.g., 4 mb Token Ring, 16 mb Token Ring, FDDI asynchronous., etc.).
3. PropagationDelay: The maximum delay that a bit experiences when crossing this segment. This attribute should be dynamically changeable.
4. NumberOfAttachments: Current count of the number of attachments on the segment that are QoS reserved data stream sources to the segment.
5. CurrentBandwidthAllocated: The current aggregate bandwidth allocated to data streams on this segment. This attribute should be dynamically changeable.
6. TrSegment: The aggregate current and minimum bandwidths allocated to QoS reserved data streams running at specific priorities on this segment.
7. BridgesConnected: The network configuration of bridges directly connected to this segment. This attribute should be dynamically changeable.
8. AttachmentList: The network configuration of attachments such as LAN Adaptors that are connected to this segment, along with the MAC address of each.

Bridge 31—Represents QoS related information for a single bridge and includes the following attributes:
1. BridgeID: An identifier of a particular bridge. This identifier should have the same format as the bridge identifier in the Route Designator Fields.
2. ProcessingDelay: The maximum delay that a packet experiences when passing through this bridge. This attribute should be dynamically changeable.
3. MaxBandwidthAllocatable: The threshold aggregate bandwidth allocatable to QoS reserved data streams through this bridge. This attribute should be dynamically changeable.
4. BandwidthAllocated: The current aggregate bandwidth allocated to QoS reserved data streams running through this bridge.
5. SegmentsConnected: The network configuration of segments connected to this bridge, including their SegmentID and their MaxBandwidthAllocatable.

QoSStream 42—Represents a QoS reserved end-to-end data stream and has the following attributes:
1. StreamID: An identifier, assigned by the allocator, that identifies this QoS reserved end-to-end data stream.
2. Route Designator Fields: Identifies the segments and bridges that the data stream passes through end-to-end (the network components between the source and destination MAC addresses). In the case where the source and destination stations are on the same segment (as in FIG. 1 ), this field identifies only the LAN segment.
3. Traffic Descriptors: Parameters, as defined above, characterizing the data stream presented to the network for transmission.
4. QoSGranted: The QoS parameters that identified the QoS allocation granted by the QoS allocator. These are defined in the QoS parameter definitions above.
5. SourceMACAddress: The MAC address of the attachment that is the source of the data stream.
6. DestinationMACAddress: The MAC address of the attachment that is the destination of the data stream.
7. AgeSinceRefresh: A counter indicating a period of time since a refresh message has been received for an allocation of QoS for this data stream.
8. AccessClass: Indicates the class under which the QoS reserved data stream accesses the EAN. For a complete description of this field, see the QoS definitions above.

LANAttachment 35—Represents an adapter (e.g., Token Ring adaptor in a station) that is the source of QoS reserved data streams on a particular segment, and having the following attributes:
1. MACAddress: The MAC address of this attachment.
2. StreamCount: The count of the number of QoS reserved data streams passing through this attachment.

BridgeAttachment 36—Represents an adapter (e.g., Bridge attachment) that sources QoS reserved data streams, and having the following attributes:
1. BridgeID: An identifier that identifies a bridge attachment to a segment.
2. StreamCount: The count of the number of QoS reserved data streams passing through this attachment.

Before proceeding to a description of the flow charts of FIGS. 4 through 11, the contents of the various messages exchanged between the stations of the local area network of FIG. 1 necessary to implement quality of service multimedia path management will be discussed. These messages include: the QoS allocation request, QoS allocation reply, QoS de-allocation announcement, QoS allocation change request, QoS change reply messages, QoS refresh announcement, allocation present announcement requestor present announcement, and requestor present reply messages. The contents of each of these messages are described below:

1. AllocationRequest—To request an allocation of a QoS path for a particular data stream.
   Route Designator Fields. Identifies the network components (e.g., segments and bridges) used to determine if this allocation request can be satisfied.
   Source MAC address. Identifies the network adaptor that is the source of the data stream.
   Destination MAC Address. Identifies the network adaptor that is the destination of the data stream.
   Traffic Descriptors. Parameters characterizing the data stream presented to the network, as described above.
   QoSDesired. The quality of service desired for this data stream.
   QoSAcceptable. The quality of service acceptable for this data stream.
   MessageID. A message identifier used to correlate the reply with the request.

2. AllocationReply—Reply to an AllocationRequest.
   StreamID. Identifies a particular QoS allocation reserved for a data stream.
   Return Code. Specifies the disposal of the request (denied or granted) and the reason for denial, if denied.
   Route Designator Fields. Identifies the network components used to determine if the QoS requested can be satisfied for a particular allocation.
   Traffic Descriptors. Parameters of the presented data stream, as described above.
   QoS Granted. QoS parameters of the path granted to data stream, if granted, as described above.
   MessageID. An identifier of this message used to correlate this reply with the corresponding Allocation Request.

3. DeAllocateAnnounce—To request a de-allocation of an already reserved QoS data stream.
   StreamID. An identifier of the particular QoS stream already allocated and which is to be de-allocated.

4. ChangeRequest—To request a change in the allocation for an already reserved QoS data stream.

Traffic Descriptors for the new data stream.

QoSDesired for the new data stream.

StreamID. Identification of the previously allocated data stream for which this change has been requested.

MessageID. Identification of this particular message to permit correlation of this request with the corresponding reply.

5. ChangeReply—To reply to a ChangeRequest.

StreamID. Identification of the previously allocated data stream for which a change has been requested.

Return Code. Indicates the results of the request (success, failure, etc.).

Traffic Descriptors of the new data stream.

QoS Granted. QoS parameters of the new allocated path.

MessageID. Identification of the ChangeRequest message to which this message is a reply, to allow correlation of the request and the reply.

6. RefreshAnnounce—to request a refreshment of an allocation request:

StreamID. An identifier that identifies a particular QoS reserved data stream (represented by the QoS Stream object in the allocator data structure) for which QoS has been allocated.

Traffic Descriptors for the data stream to be refreshed.

QoS Granted. QoS parameters for the allocation being refreshed.

Route Designator Fields. Identify the network components of the allocated path being refreshed.

Source MAC Address. Identifies the individual MAC address of the network adaptor that is the source of the data stream being refreshed.

Destination MAC Address. Identifies the individual MAC address of the adaptor that is the destination of the data stream being refreshed.

6. AllocatorPresentAnnounce—To indicate to the requestors that the allocator has come up. No attributes are defined for this message.

7. RequestorPresentAnnounce—To indicate to the allocator that a requestor has come up. No attributes are defined for this message.

8. RequestorPresentReply—The refresh message required to maintain an allocation once it has been set up.

RefreshTimerDuration. The length of time between successive refresh messages from a requestor to the allocator.

Turning then to FIG. 3, there is shown a graphical representation of a typical type of QoS message transmitted in the system of FIG. 1. An allocation request message will be described in connection with FIG. 3. It should be noted, however, that all of the messages discussed above will have similar formats, but including the fields (attributes) itemized above. The allocation request message of FIG. 3 includes a header field 50 identifying this message as an allocation request (MessageID). Following header 50 are the routing fields 51 (Route Designator Fields) which specify the path components to be used in the allocated path. As noted above, the RIF field of the standard path generator can be used in this allocation request. Also included in the allocation request message of FIG. 3 are the source address field 52 (Source MAC Address) and destination address field 53 (Destination MAC Address). Fields 52 and 53 contain the MAC addresses (hardware addresses) of the source and destination stations for the multimedia data. In field 54 are the Data Stream Descriptors, which specify the multimedia data stream to be transmitted. Field 55 contains a specification of the quality of service which is desired for this data stream while field 56 contains a specification of the minimum quality of service which is acceptable for this data stream.

Figure 4:
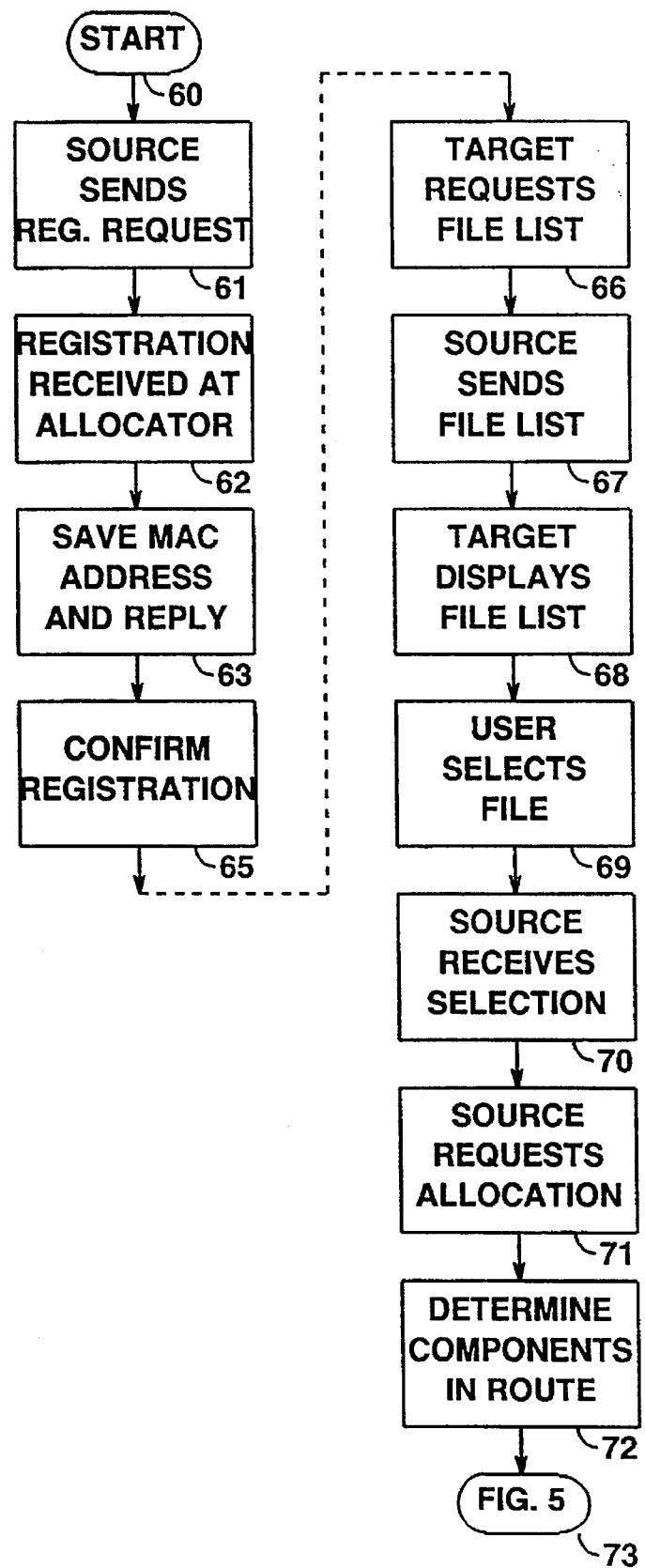
FIGS. 4 and 5, taken together, show a flow chart of the process of making a quality of service allocation for a multimedia transmission path between a source station and a target station in the network of FIG. 1.

In FIG. 4 there is shown a flow chart of the process of allocating a QoS transmission path between a source of multimedia data and a user of such data. The particular type of multimedia transmission discussed in connection with FIG. 4 is a Server/Client distribution such as distributing multimedia files from a central library to a plurality of widely distributed library subscribers. The modifications of FIG. 4 required to accommodate other types of, for example, Client/Client transmission will be obvious to persons of ordinary skill in the multimedia distribution art. Starting in FIG. 4 at start box 60, box 61 is entered where a source, such as source station 10 of FIG. 1, formats (in QoS protocol machine 13) a request to be registered in QoS allocator station 20 for the transmission of a multimedia file supplied by application 11. Such pre-registration is important in that it allows the identification of the data source station to be registered in QoS allocator 20 prior to the actual transmission of the data. If the requestor had previously gone down in the middle of a transmission, this allows the allocator 20 to terminate (de-allocate) all QoS streams previously allocated for this requestor. The registration message is received by allocator 20 in box 62 and, in box 63, the MAC addresses of the source is extracted and stored. The registration of this data is reported back to the source station in box 65. Source station 10 must, in fact, re-register every time it comes back up after a failure or cessation of operation.

At some later time, in box 66, the target station 29 (FIG. 1) requests a list of the multimedia data files available from source station 10. In box 67, the source station sends a list of the available multimedia files to target station 29 which the target station displays in box 68. In box 69, the user at target station 29 selects a multimedia file to be transmitted and transmits this selection back to the source station 10. In box 70, the source station receives the selection and, in box 71, the source station 10 actually sends a request to the allocator 26 to determine if the QoS parameters required for the data stream is available on the transmission path between source station 10 and target station 29. In box 72, allocator station 20 uses the route descriptor to determine if the QoS is available in the components in the multimedia transmission path. These components must, of course, meet the requirements of the QoS specification for the file to be transmitted before the allocation request to be granted.

Figure 5:
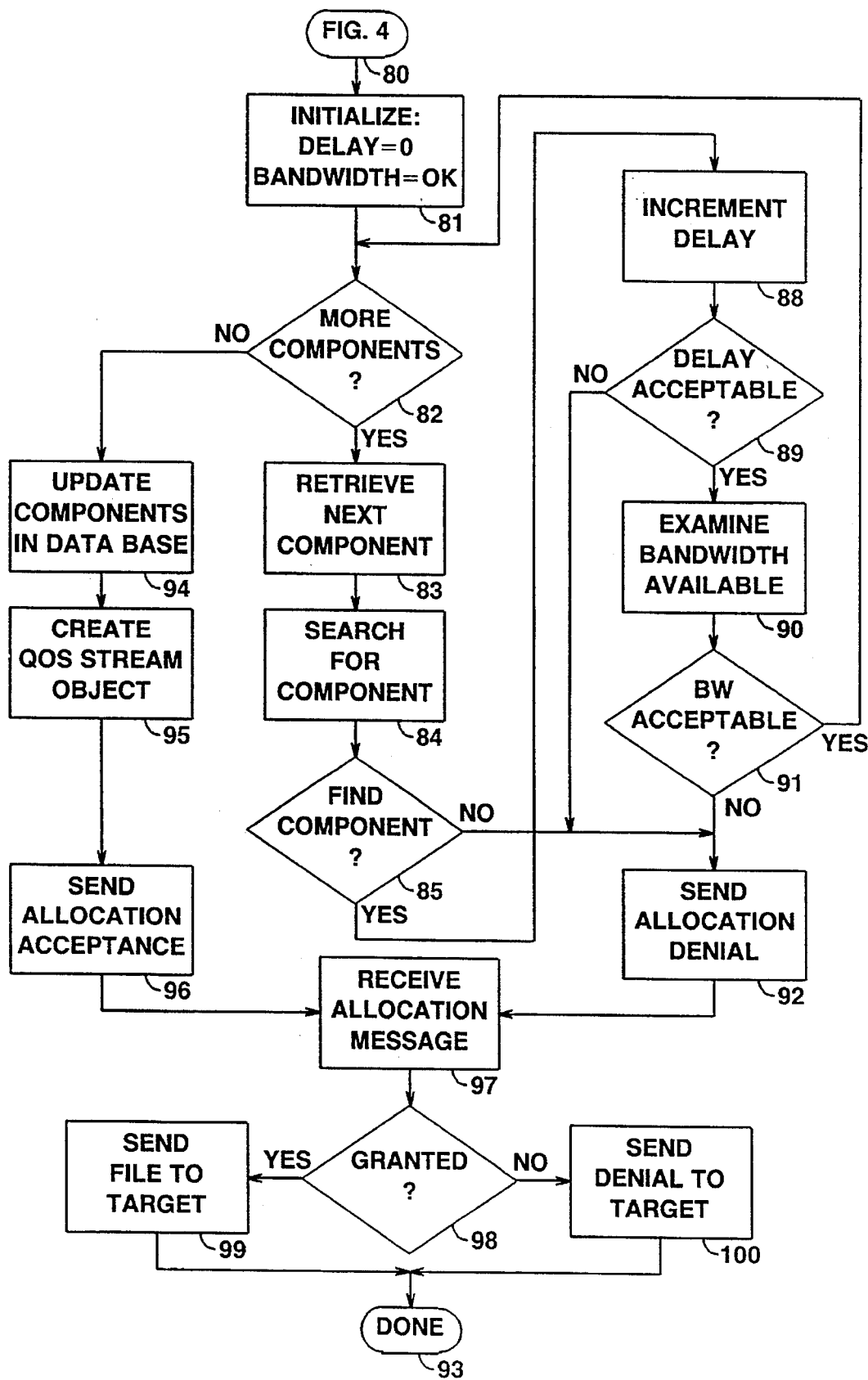

Continuing in FIG. 5, in box 81 the path delay parameter is initialized at zero while the path bandwidth is initialized as "OK," indicating that the bandwidth is adequate until determined to be otherwise. In decision box 82, the route component identification list obtained in box 72 of FIG. 4 is consulted to determine if there are any unexamined components left on the list. If more components remain on the list, box 83 is entered where the next component identification is retrieved from the list. In box 84 the data base 25 of FIG. 1 is searched for the identified component parameters. Decision box 85 is then entered to determine if the component parameters are found in the data base 25. If the component parameters are found, box 88 is entered to increment the available path delay parameter, initialized in box 81, by the amount of delay in the current component. The decision box 89 is then entered to determine if the path delay parameter accumulated so far is not greater than the maximum delay QoS parameter required for this multimedia file. If the delay is still acceptable, box 90 is entered to examine the bandwidth available parameter for this component. Decision box 91 is then entered to determine if the bandwidth available in this component is adequate to meet the QoS bandwidth parameter required for this multimedia file. If the available bandwidth is adequate for this multimedia file, decision box 82 is re-entered to consider the next component on the path component list from box 72 of FIG. 4.

If there are no more components on the component list, as determined by decision box 82, box 94 is entered to update the component values on the component list. For example, the bandwidth of this multimedia file must be subtracted from the previously available bandwidth on the components in the multimedia data path to determine the new bandwidth available for the next allocation. Box 95 is then entered to create a new data object for this new QoS data stream having the attributes enumerated above. This QoS data stream object is used whenever it is necessary to deallocate this data stream.

Box 96 is then entered to send an allocation acceptance message to the source of the multimedia file. In box 97 this acceptance is received at the source station 10 and, in decision box 98, it is determined whether this message is an acceptance message or a denial message. If the allocation has been accepted, box 99 is entered where the multimedia file is transmitted to the target station 29 The process then terminates in terminal box 93.

If an identified component cannot be found in data base 25 of FIG. 1, as determined by decision box 85, box 92 is entered where an allocation denial message is sent to the source station 10. The failure to find an identified component in the data base indicates that the data base 25 (FIG. 1) does not contain current information about the components in the network, and therefore the request cannot be satisfied. This denial message is received by the source station 10 in box 97 and identified as a denial message in decision box 98. Box 100 is then entered to notify the target station 29 of the denial of the multimedia file transmission request. The process then terminates in box 93.

If the accumulated delay of the path becomes unacceptable, as determined by decision box 89, or if the bandwidth available in the component is unacceptable, as determined by decision box 91, box 92 is also entered to send an allocation denial message to the source station 10 and thence to the target station in box 100. The process of FIGS. 4 and 5 then terminates in terminal box 93.

Figure 6:
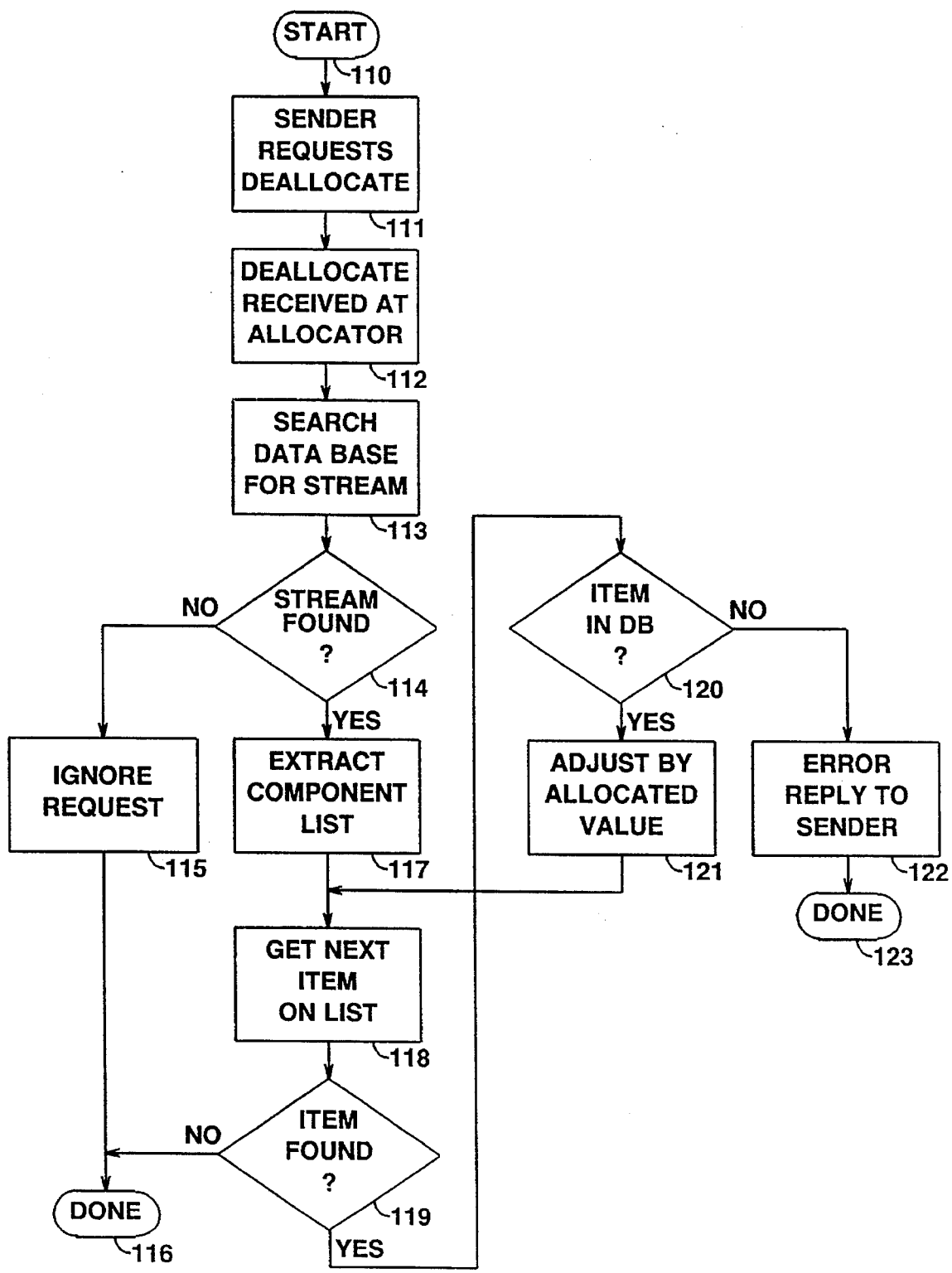
FIG. 6 shows a flow chart of the process of making a quality of service de-allocation of a multimedia transmission path previously established between a source station and a target station in the network of FIG. 1.

In FIG. 6 there is shown a flow chart of the process of de-allocating a previously allocated QoS data stream for a multimedia file, allocated in accordance with the process of FIGS. 4 and 5. Starting at start box 110, box 111 is entered where the source station 10 of FIG. 1 requests a de-allocation of an allocated QoS data stream, presumably because the file transmission is complete. This de-allocation is received at allocator 20 in box 112. As will be described hereinafter, such de-allocation can also be initiated in allocator station 20 by the garbage collection process of FIG. 10. Regardless of how the de-allocation process is started, box 113 is then entered where the data base 25 in allocator 20 is searched for the identified QoS data stream object. Decision box 114 is then entered where it is determined whether or not the data stream object is found in data base 25. If the data stream is found, box 117 is entered where the list of component identifications for this data path is retrieved from the data stream object attributes. In box 118, the next item on this component identification list is obtained. Decision box 119 is then entered to determine if another component identification was found on the list. If so, decision box 120 is entered to determine if the identified transmission component is represented by a data base object in data base 25. If the identified component is found in data base 25, box 121 is entered where the bandwidth available parameter value is adjusted, when appropriate, by the de-allocation value. For example, the bandwidth of the stream to be de-allocated is added back to the available bandwidth for this component to be used for future allocations. Box 118 is then re-entered to get the next component identification on the list. It is to be noted that, as described above, each component in the database 25 includes a BandwidthAllocated parameter that represents the amount of bandwidth already allocated to paths in use. Upon a de-allocation of a path, this parameter is increased by the amount of bandwidth being de-allocated.

If the QoS data stream object is not found for this de-allocation, as determined by decision box 114, box 115 is entered where the request for de-allocation is ignored and the process terminated in terminal box 116. That is, if a de-allocation request is received for a data stream which does not exist (according to data base 25), this de-allocation cannot be carried out. Similarly, if no more components are found on the list, as determined by decision box 119, the de-allocation process is complete and the process is again terminated in terminal box 116. Finally, if the identified component in the de-allocation request is not found in the data base, as determined by decision box 120, box 122 is entered where an error response is formulated and sent to the de-allocation request source, and the process terminated in box 123. That is, if a component is identified as part of a path to be de-allocated, but that component is not in the data base, an error has occurred and the de-allocation request source is notified to attempt to detect and correct the error.

Figure 7:
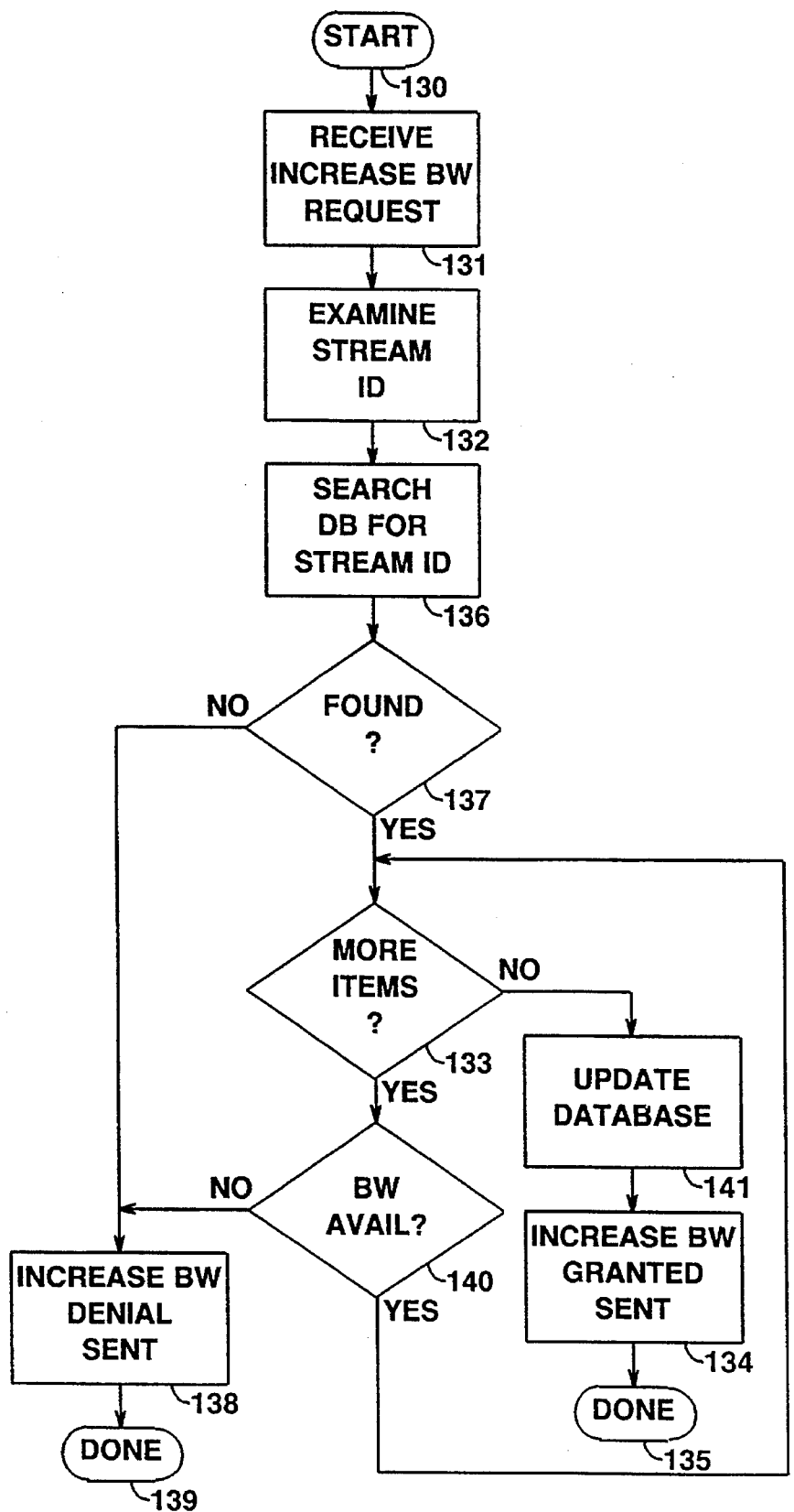
FIG. 7 shows a flow chart of the process of increasing the bandwidth of a previously established multimedia transmission path QoS allocation between a source station and a target station in the network of FIG. 1.

In FIG. 7 there is shown a flow chart of the process for increasing the bandwidth for an already existing transmission path allocation, for example, if the transmission changes from a one-way Client/Server transmission to a two-way Client/Client interactive transmission. Starting in start box 130 of FIG. 7, box 131 is entered where the request for a bandwidth increase is received at the allocator station 20 of FIG. 1. Box 132 is then entered where the StreamID contained in the ChangeRequest message is examined This StreamID identifies a particular QoS stream object (42 in FIG. 2) that contains, inter alia, the component list for the data stream previously allocated. In Box 136, the allocator data base 25 (FIG. 1) is searched to retrieve the data contents of the identified QoS stream object. If the identified QoS stream object is not found in data base 25, as determined by decision box 137, box 138 is entered and a denial message is sent to the bandwidth increase requestor and the process terminated in terminal box 139. If the identified QoS stream object is found in data base 25, as determined by decision box 137, decision box 133 is entered to determine if there is another component identification on the component list in the QoS stream object. If so, the item is examined in decision box 140 to determine if the requested increase in bandwidth is available in this component. If so, decision box 133 is then re-entered to get the next component on the item list. If it is determined in decision box 133 that no more items are on the list, box 141 is entered where the BandwidthAllocated parameter for the components in the path tare updated in data base 25 to reflect the increase in bandwidth for each of the components on the list. Box 134 is then entered where a message is formulated and sent to the requesting station indicating that the request for an increase in bandwidth is granted. The process then terminates in box

135.

If it is determined in decision box 137 that an identified component cannot be found in the data base, or if it is determined in decision box 140 that the requested bandwidth increase is not available in this component, box 138 is entered where a message is formulated and sent to the requesting station denying the request. The process then terminates in terminal box 139.

Figure 8:
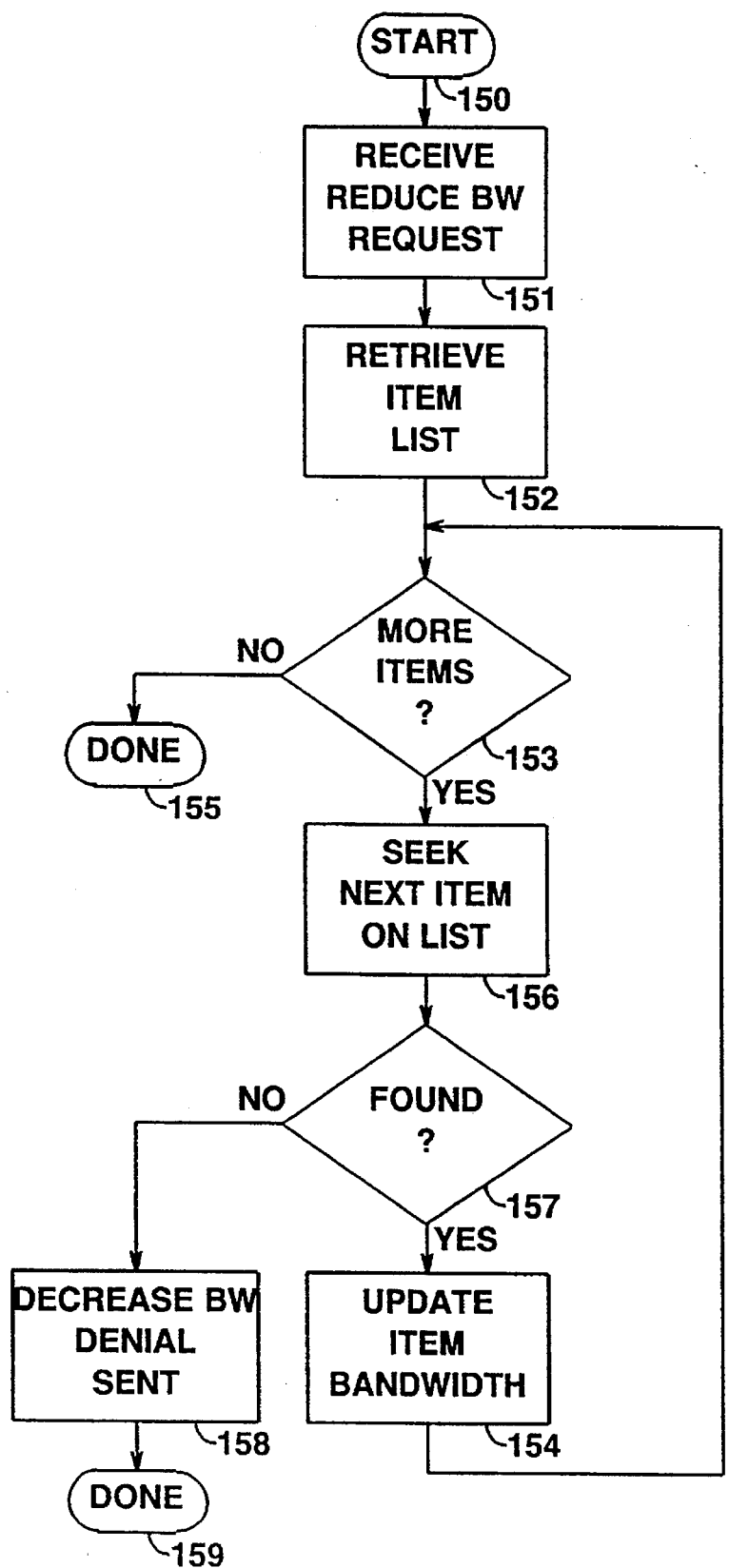
FIG. 8 shows a flow chart of the process of decreasing the bandwidth of a previously established multimedia transmission path QoS allocation between a source station and a target station in the network of FIG. 1.

In FIG. 8 there is shown a flow chart of the process of reducing the bandwidth required for a previously granted transmission path allocation, for example, to accommodate a change to a one-way transmission from a two-way transmission. Starting in start box 150, box 151 is entered where the request to reduce the bandwidth of an existing allocation is received at the allocator station 20. In box 152, the component identification list in the request is retrieved. In decision box 153 it is determined if any more items remain on the component identification list. If so, box 156 is entered where the component identification is used to search for the component data records in the data base 25 of FIG. 1. In decision box 157 it is determined if the component sought in box 156 has been found in data base 25. If so, box 154 is entered where the bandwidth available in this component is updated by increasing the available bandwidth by the amount of the requested reduction. Decision box 153 is then re-entered to look at the next component on the list. If no more items are found on the list, as determined by decision box 153, the process terminates in box 155. If the component sought in box 156 cannot be found, as determined by decision box 157, box 158 is entered where a message is formulated and sent to the request sender denying the request for an reduction of bandwidth and identifying the component not found.

Figure 9:
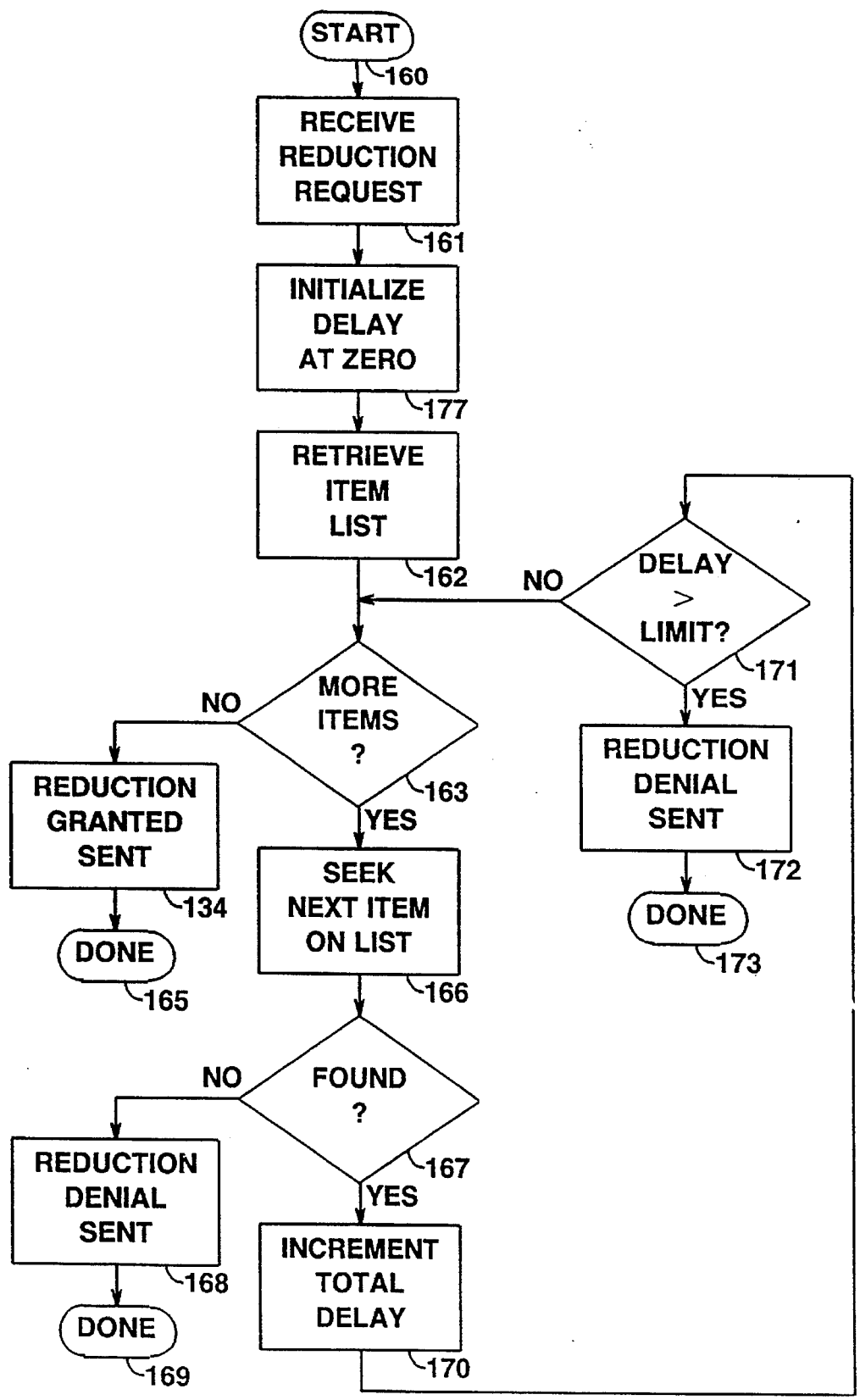
FIG. 9 shows a flow chart of the process of reducing the delay requirements of a previously established multimedia transmission path QoS allocation between a source station and a target station in the network of FIG. 1.

In FIG. 9 there is shown a flow chart of the process for reducing the delay in an already allocated path for the transmission of multimedia data between a source station and a target station. It is to be noted that the delay in the overall path cannot be increased or reduced. The request to reduce is, in fact, an inquiry as to whether the assigned path in fact has a delay less than the originally requested delay.

Returning to FIG. 9, starting in start box 160, box 161 is entered where the request to reduce the delay for a particular previously allocated transmission path is received. Box 177 is then entered where the accumulated delay is initialized at zero. In box 162 the component identifier list for the path is retrieved from the request and decision box 163 is entered to determine if there are any more component identifications on the list. If there is more component identifications on the list, box 166 is entered where the component identification is used to seek the identified component in data base 25. In decision box 167 it is determined whether or not the item is found. If the item is found, box 170 is entered where the accumulated delay value initialized in box 177 is incremented by the amount of delay introduced by this component. Decision box 171 is then entered to determine if the total accumulated delay is less that the requested reduced limit of delay. If not, decision box 163 is re-entered to look at the next component on the component list. If the delay limit is exceeded, as determined by decision box 171, box 172 is entered where a request denial is formulated and sent to the requesting station. The process then terminates in terminal box 173.

Figure 10:
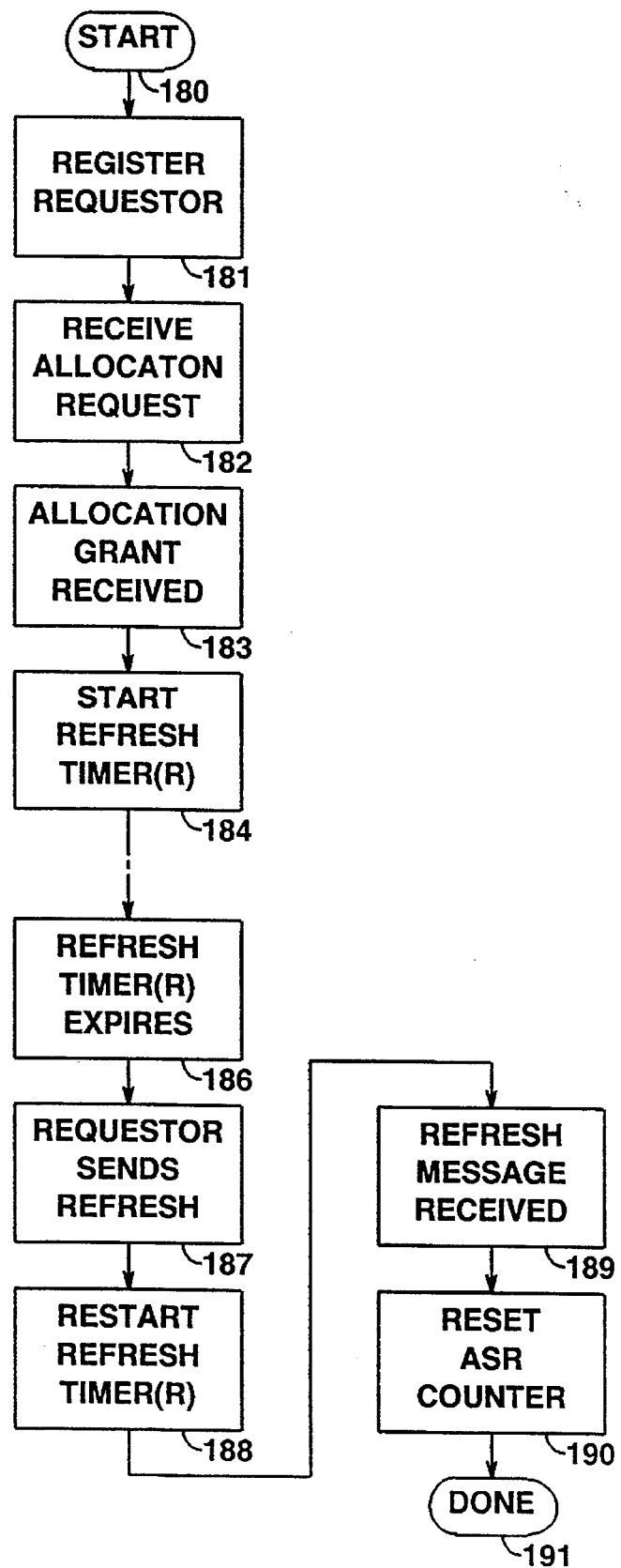
FIG. 10 shows a flow chart of the process of garbage collection in the quality of service path allocator of FIG. 1 whereby only active allocations of bandwidth are maintained in the allocator data base.
Figure 11:
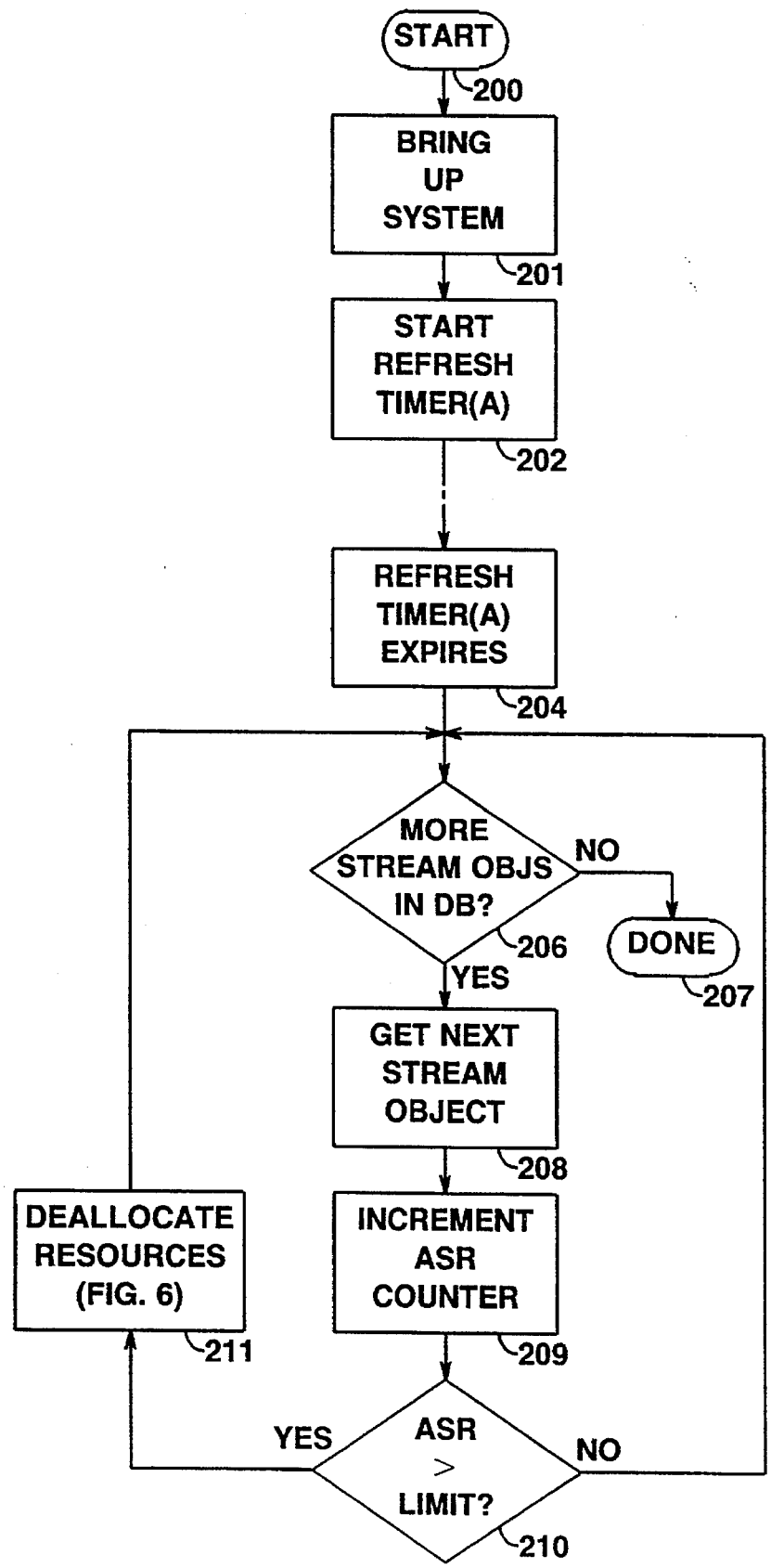
FIG. 11 shows a flow chart of the process of refreshing allocation requests in order to assure the continued allocation of the resources required to implement that allocation request.

In FIG. 10 there is shown a flow chart of the process used in the QoS traffic management system of the present invention to ensure that the allocation of multimedia transmission paths do not persist beyond the actual need for those allocated paths due to failures in transmission components, software failures or any other unexpected interruption in the proper operation of the QoS allocation system. In accordance with the present invention, each source station, like source station 10 in FIG. 1, must continually refresh its request for the QoS data stream allocation at predetermined intervals or the requested bandwidth will be de-allocated to make this bandwidth available for other connections. The allocation system is thus "fail safe" in the sense that a failure anywhere in the system provokes a timely bandwidth deallocation and does not permit this bandwidth to be tied up with a failed connection. In FIG. 10 there is shown the refresh process itself while FIG. 11 shows the "garbage collection" process which results when the refresh process fails to provide a timely refresh announcement.

Starting at start box 180 of FIG. 10, box 181 is entered where requesting stations are registered, as detailed in FIG. 4. During this registration process, the requestor station 10 receives the RefreshTimerDuration from the allocator station 20. In box 182, a request for an active allocation is received at the allocator station 20 of FIG. 1. This request is processed as detailed in FIG. 5 and ultimately the request is granted. An AllocationReply message is then sent from allocator station 20 (FIG. 1) to source station 10, indicating that the request has been granted. The source station 10, in turn, receives the AllocationReply message in box 183, and box 184 is entered to start an allocation refresh timer in source station 10 which is unique to this request.

In due time, the allocation request timer started in box 184 expires which event is detected in box 186. When the allocation refresh timer expires, as detected by box 186, box 187 is entered where the source station 10 formulates and sends a QoS Refresh Announcement message to the allocator station 20. Box 188 is then entered to restart the refresh timer at the source station 10 and thus start a new refresh interval.

When the QoS Refresh Announcement message is received at allocator station 20, box 189 is entered to detect that fact. In box 190, the Age Since Refresh (ASR) counter for this allocation is reset in allocator station 20. The process of FIG. 10 then terminates in terminal box 191. As will be seen in FIG. 11, it is the Age Since Refresh counter which controls the de-allocation process when the refresh mechanism fails.

As can be seen in FIG. 10, each allocated path between a source station and a target station in the network of FIG. 1 initiates a allocation refresh process in the source station which sends a new allocation refresh message at the end of every subsequent refresh period. The refresh period is, of course, predetermined at a value which avoids unnecessary de-allocation of allocated bandwidth but yet avoids the continued allocation of bandwidth after a failure in the source station. In this way, the resources of the network of FIG. 1 are used optimally, a result which is of particular importance for networks serving heavy users of bandwidth such as multi-media services.

In FIG. 11 there is shown the "garbage collection" process for the QoS traffic management system of the present invention. More particularly, starting in box 200, box 201 is entered where the allocator system of the present invention is initially started up. At that time, box 202 is entered where an allocation refresh timer at the allocator station 20 is started. Note that this allocator refresh counter is similar to, but distinct from, the requestor refresh counter in the source station 10, and that only one allocator refresh timer is needed regardless of the number of allocated QoS streams. Box 204 is entered when the allocator refresh timer expires. Decision box 206 is then entered where it is determined whether or not any stream objects (42 in FIG. 2) can be found in the data base 25 of FIG. 1. If so, box 208 is entered where the next stream object is retrieved from the data base 25. The "AgeSinceRefresh" (ASR) count field of that QoS stream object is incremented in box 208. Note that, at any time, a Refresh Announce message from the corresponding source station resets the ASR count to zero for that QoS stream object in the data base 25. Note also that a request to change the allocation for a particular QoS stream object also resets the ASR count to zero for that QoS stream object.

In decision box 210, the count in the ASR count field is checked to determine if the value in the ASR count field exceeds the AgeLimit threshold prescribed in the attributes of allocator 30. If this AgeLimit is not exceeded, decision box 206 is re-entered to look for another QoS stream object in the data base 25, and the ASR update process of boxes 208, 209 and 210 repeated for that QoS stream object. If the ASR count in any QoS stream object exceeds the ASR age limit, as determined by decision box 210, box 211 is entered where the resource de-allocation process described in connection with FIG. 6 is invoked to de-allocate the resources specified in the Rome Designator Fields of that QoS stream object. If no more stream objects are found in the data base, as determined by decision box 206, terminal box 207 is entered to terminate the garbage collection process. The process of FIG. 11 will, of course, be restarted each time the allocation request timer expires.

It can be seen that the garbage collection process of FIG. 11 serves to de-allocate resources of those connections for which a refresh announcement message is not received at regular intervals. The AgeLimit value tested in decision box 210 is selected to assure timely de-allocation of the reserved data stream bandwidth and yet not cause unnecessary reallocations. This automatic de-allocation is a "fail safe" mechanism for network resources in that a failure in the system causes de-allocation by the failure of the refresh messages to arrive at the allocator station 20 rather than relying on a failure signal arriving at the allocator station 20.

The processes of FIGS. 4 through 10 can, of course, be implemented by designing appropriate special purpose circuits. In the preferred embodiment, however, the processes of FIGS. 4–10 are implementing by programming a general purpose computer of the type normally used to control user stations in packet or cell transmission networks. Such programming is obvious to persons skilled in the LAN control and operation arts and will not be further described here.

What is claimed is:

1. A local area network comprising a plurality of user stations on said network, transmission means for interconnecting said user stations to each other over a plurality of transmission components, means for selecting a data path between two of said stations, and quality of service management means connected by said transmission means to said plurality of user stations for ensuring that each path selected by said means for selecting a data path meets pre-defined quality of service parameters, said quality of service management means comprising:

means for storing a plurality of parameters for each of said transmission components, means responsive to a request for a multimedia path between two of said user stations for comparing each requested path component parameter to the corresponding stored parameter for the requested path components; and means for allocating said path when the stored parameters, for each component of a requested path, equal or exceed the requested parameters, and for denying the allocation of said path when the stored parameters for at least one component of a requested path is less than the corresponding requested parameter.

2. The local area network according to claim 1 further comprising means for utilizing existing path determinations from said stations to request said multimedia path and to compare said component parameters.

3. The local area network according to claim 1 wherein said means for storing comprises means in said quality of service management means, for storing quality of service parameters of each resource in said network.

4. The local area network according to claim 1 wherein said means for storing comprises means, in said quality of service management means, for storing information concerning all currently existing transmission paths previously allocated by said quality of service management means.

5. The local area network according to claim 1 further comprising means, at each of said stations, for requesting the registration of the parameters of a data stream originating at said each station and the identification of a path to be used for the transmission of said data stream to a destination station, said parameters and said path identification being registered in said quality of service management means.

6. The local area network according to claim 1 further comprising means for deallocating a transmission path in said network previously allocated for a multimedia data transmission through said network.

7. The local area network according to claim 1 further comprising means for altering the parameters of a previously allocated path in said network.

8. The local area network according to claim 1 further comprising means for automatically de-allocating previously allocated transmission paths in said network in response to the failure of an allocation refreshing mechanism.

9. A method for managing multimedia transmissions in local area network comprising the steps of attaching a plurality of user stations to said network, interconnecting said user stations to each other over a plurality of transmission components, selecting a data path between two of said stations, and ensuring that each path selected by said step of selecting a data path meets pre-defined quality of service parameters, said step of ensuring further comprising the steps of storing a plurality of parameters for each of said transmission components, comparing, in response to a request for a multimedia path between two of said user stations, each requested path component parameter to the corresponding stored parameter for the requested path components; and allocating said path when the stored parameters, for each component of a requested path, equal or exceed the requested parameters, and denying the allocation of said path when the stored parameters for at least one component of a requested path is less than the corresponding requested parameter.

10. The method according to claim 9 further comprising the step of utilizing existing path determinations from said stations in said step of requesting paths and said step of comparing component parameters.

11. The method according to claim 9 further comprising the step of storing, in said method for managing multimedia transmissions, quality of service parameters of each resource in said network.

12. The method according to claim 9 further comprising the step of storing, in said method for managing multimedia transmissions, information concerning all currently existing transmission paths previously allocated by said method for managing multimedia transmissions.

13. The method according to claim 9 further comprising the step of requesting, at each of said stations, the registration of the parameters of a data stream originating as said station and the identification of a path to be used for the transmission of said data stream to a destination station, said parameters and registering said path identification in said method for managing multimedia transmissions.

14. The method according to claim 9, further comprising the step of de-allocating a transmission path in said network previously allocated for a multimedia data transmission through said network.

15. The method according to claim 9 further comprising the step of altering the parameters of a previously allocated path in said network.

16. The method according to claim 9 further comprising the step of automatically de-allocating previously allocated transmission paths in said network in response to the failure of an allocation refreshing mechanism.

17. A quality of service management system for source routing local area networks including a plurality of user stations interconnected by a plurality of transmission components, said management system comprising a quality of service management station connected by said transmission means to said plurality of user stations, said quality of service management station comprising:

means for storing a plurality of parameters for each of said transmission components, means responsive to a request for a multimedia path between two of said user stations for comparing each requested path component parameter to the corresponding stored parameter for the requested path components; and means for allocating said path when the stored parameters, for each component of a requested path, equal or exceed the requested parameters, and for denying the allocation of said path when the stored parameters for at least one component of a requested path is less than the corresponding requested parameter.

18. The quality of service management system according to claim 17 further comprising means for utilizing existing path determinations from said, stations in said requests for paths and for said comparing of component parameters.

19. The quality of service management system according to claim 17 further comprising means for storing quality of service parameters of each resource in said network.

20. The quality of service management system according to claim 17 further comprising means for storing information concerning all currently existing transmission paths previously allocated by said quality of service management system.

21. The quality of service management system according to claim 17 further comprising means at each of said stations for requesting the registration of the parameters of a data stream originating at said station and the identification of a path to be used for the transmission of said data stream to a destination station, and means for registering said parameters and said path identification in said quality of service management system.

22. The quality of service management system according to claim 17 further comprising means for de-allocating a transmission path in said network previously allocated for a multimedia data transmission through said network.

23. The quality of service management system according to claim 17 further comprising means for altering the parameters of a previously allocated path in said network.

24. The quality of service management system according to claim 17 further comprising means for automatically de-allocating previously allocated transmission paths in said network in response to the failure of an allocation refreshing mechanism.

\* \* \* \* \*